(12) United States Patent
Bray

(10) Patent No.: US 10,617,106 B1
(45) Date of Patent: Apr. 14, 2020

(54) BAIT CUTTER AND STORAGE DEVICE

(71) Applicant: Buford S. Bray, Clinton, TN (US)

(72) Inventor: Buford S. Bray, Clinton, TN (US)

( * ) Notice: Subject to any disclaimer, the term of this patent is extended or adjusted under 35 U.S.C. 154(b) by 0 days.

(21) Appl. No.: 16/263,908

(22) Filed: Jan. 31, 2019

(51) Int. Cl.
*A01K 97/04* (2006.01)
*B26B 11/00* (2006.01)
*B65D 85/50* (2006.01)

(52) U.S. Cl.
CPC ............ *A01K 97/045* (2013.01); *B26B 11/00* (2013.01); *B65D 85/50* (2013.01)

(58) Field of Classification Search
CPC .... A01K 97/045; A01K 97/04; Y10T 83/222; Y10T 83/9447; Y10T 83/8812; Y10T 83/889; Y10T 83/7587
USPC .......... 83/607, 648, 167, 466.1, 694
See application file for complete search history.

(56) References Cited

U.S. PATENT DOCUMENTS

| | | | | |
|---|---|---|---|---|
| 322,105 A * | 7/1885 | Istel | ........................ | A24F 15/18 206/238 |
| 848,057 A * | 3/1907 | Seckendorff | ............ | A01J 23/00 83/609 |
| 1,044,966 A * | 11/1912 | Currey | ..................... | B26D 1/30 83/607 |
| 2,076,157 A * | 4/1937 | Perkins | .................. | A01K 97/06 43/57.1 |
| 2,655,259 A * | 10/1953 | Davoren | ............... | A61J 7/0007 225/43 |
| 2,840,907 A * | 7/1958 | Herman | .................. | A47G 19/26 83/607 |
| 4,060,892 A * | 12/1977 | Kondo | .................... | B26B 27/00 30/253 |
| 4,159,568 A * | 7/1979 | Berner | .................. | B65D 85/42 30/124 |
| 4,253,650 A * | 3/1981 | Kuzio | .................... | A22C 25/08 269/87.2 |
| 4,628,717 A * | 12/1986 | Blum | .................... | A45C 11/321 30/162 |
| 4,794,670 A * | 1/1989 | Savastano, Jr. | ........ | A01K 97/00 452/149 |
| 4,957,025 A * | 9/1990 | Beno | ........................ | B26D 1/30 83/468 |
| 5,351,818 A * | 10/1994 | Daneshvar | ................ | A61J 1/03 206/216 |
| 6,805,032 B2 * | 10/2004 | Engdahl | ................. | B26D 1/553 30/114 |
| 7,065,880 B2 * | 6/2006 | Howman | ............... | A21C 15/04 30/114 |
| 2006/0231518 A1 * | 10/2006 | Suffa | .................. | B65D 47/0838 215/237 |
| 2014/0345187 A1 * | 11/2014 | Fontaine | ................ | A01K 97/04 43/55 |

(Continued)

*Primary Examiner* — Magdalena Topolski
(74) *Attorney, Agent, or Firm* — Pitts & Lake, P.C.

(57) ABSTRACT

A device to cut and store bait, the device having a base including a floor and a wall extending upward from a perimeter of the floor, a recess extending from an upper edge of the wall, a lid configured to fit in register with the upper edge of the wall so as to form an enclosure with the base when the device is closed, and a cutting member extending from the lid and configured to be positioned adjacent the recess when the device is closed so as to substantially block access to the enclosure through the recess, wherein the cutting member is configured so as to move through an area adjacent and axial to the recess when the lid is being closed.

6 Claims, 3 Drawing Sheets

(56) References Cited

U.S. PATENT DOCUMENTS

2017/0202195 A1* 7/2017 Volker ................ A01K 97/045

* cited by examiner

BAIT CUTTER AND STORAGE DEVICE

CROSS-REFERENCE TO RELATED APPLICATIONS

Not applicable.

FIELD OF INVENTION

The present general inventive concept relates to bait storage device, and, more particularly, to a bait storage device with an integrated cutter to cut bait used for fishing.

BACKGROUND

Fishing is a favorite pastime of many people both young and old. One of the simplest and most popular baits used in fishing is nightcrawlers, or earthworms. However, the excessive length of nightcrawlers typically leads to the practice of fishermen cutting or tearing off a portion of the nightcrawler to put on the hook as bait. Not only can this be messy if done by hand, but it also introduces the problem of what to do with the remainder of the cut or torn worm. Typically, the remaining portion of the worm will simply be place back in a container with the rest of the nightcrawlers, which makes it problematic to find when the fisherman is ready to rebait the hook. Thus, it would be desirable to have a device that would aid in the separation of the desired portion of the worm while decreasing the associated mess, as well as keeping the remainder of that worm separate from the undamaged worms.

BRIEF SUMMARY

According to various example embodiments of the present general inventive concept, a device is provided to aid a fisherman in neatly cutting a nightcrawler and keeping the unused portion of the nightcrawler separate from the remaining nightcrawlers, and yet still easily accessible to the fisherman.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing a device to cut and store bait, the device including a base including a floor and a wall extending upward from a perimeter of the floor, a recess extending from an upper edge of the wall, a lid configured to fit in register with the upper edge of the wall so as to form an enclosure with the base when the device is closed, and a cutting member extending from the lid and configured to be positioned adjacent the recess when the device is closed so as to substantially block access to the enclosure through the recess, wherein the cutting member is configured so as to move through an area adjacent and axial to the recess when the lid is being closed.

The foregoing and/or other aspects and advantages of the present general inventive concept may also be achieved by providing a device to cut and store bait, the device including a rectangular base including a floor, first and second end walls extending upward from a perimeter of the floor, and first and second side walls extending upward from the perimeter of the floor, a lid configured to fit in register with an upper edge of the first and second end and side walls, a recess extending downward from an upper edge of the first end wall, and a cutting member extending from the lid and configured to be positioned adjacent the recess when the device is closed so as to substantially block access to the enclosure through the recess, wherein the cutting member is configured so as to move through an area adjacent and axial to the recess with a shearing action when the lid is being closed.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Figure 1:
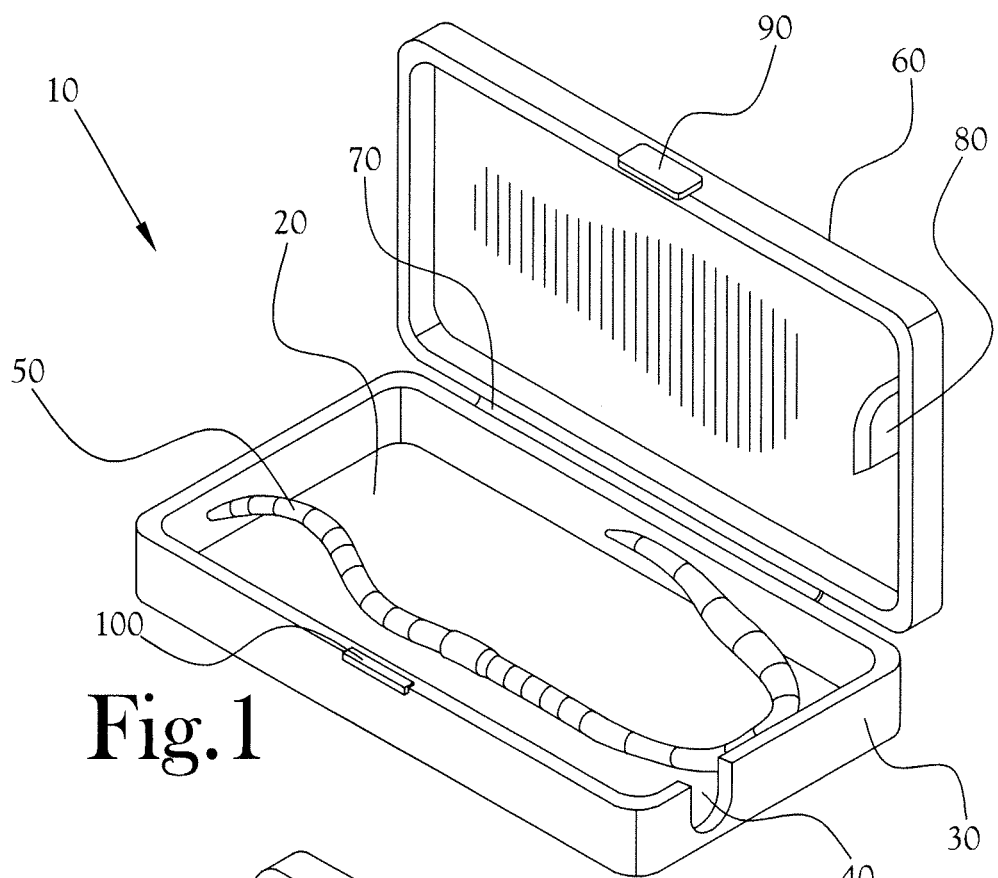
FIG. 1 illustrates a bait cutting and storage device according to an example embodiment of the present general inventive concept.

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Various example embodiments of the present general inventive concept described herein provide a device that makes using nightcrawlers as fishing bait much easier and cleaner for a fisherman. Rather than using his or her fingers to tear off a portion of the nightcrawler, or a pocketknife, the device described herein can be used to cleanly cut off a desired portion of the nightcrawler with a guillotine type action. This prevents the associated mess of the separation from getting on the fingers or knife of the fisherman. Also, the device is provided with a storage chamber to store the remaining part of the nightcrawler so that the fisherman can simply slip the device into his or her pocket, and readily retrieve it to get another portion of the nightcrawler when the fisherman is ready to rebait the hook. Various example embodiments of the present general inventive concept are simple enough to use one-handed, so that the fisherman can put the desired portion of the nightcrawler on the hook and use the device with one hand to cut off the worm with the closing action of the device, and place the device in a pocket or other conveniently accessed location for later. Various example embodiments may also be easily opened with one hand to make rebaiting the hook more convenient. It is noted that while nightcrawlers are typically discussed in these described embodiments, the present general inventive concept is not restricted to only nightcrawlers. Rather, other types of baitworm, or many other forms of bait that the fisherman desires to cut, may be used with the devices described herein. It is also noted that nightcrawlers may be interchangeably referred to in the descriptions herein as earthworms or worms.

FIG. 1 illustrates a bait cutting and storage device according to an example embodiment of the present general inventive concept. As illustrated in FIG. 1, this example embodiment of the bait cutting and storage device 10 includes a base having a floor 20 and a wall 30 extending upward from a perimeter of the floor 20 to form a receiving area to hold one or more worms 50. In this example embodiment, the device 10 is generally rectangular in shape, with the wall 30 including two side walls and two end walls, but it is understood that different example embodiments of the present general inventive concept may provide a host of different shapes and configurations. For example, the device could be square, round, oblong, etc., without departing from the scope of the present general inventive concept. In the example embodiment illustrated in FIG. 1, a recess 40 is formed in one of the end walls to receive the worm 50 at a position in which the length of the worm 50 outside of the wall 30 is the length of the worm 50 that the fisherman wishes to remove to use as bait. The recess 40 is illustrated in this example embodiment as extending downward from a top edge of the wall 30 and terminating with an arcuate edge, but it is understood that the recess 40 can be formed in a host of different configurations, such as an angled notch, a squared recess/indentation/cutout, etc., as well as at different positions around the perimeter of the wall 30, without departing from the scope of the present general inventive concept. The device 10 is provided with a lid 60 that is coupled to the base by a hinge member 70 such that the lid 60 may be close to substantially enclose the area inside the floor 20, walls, 30, and lid 60. A cutting member 80 extends from the lid 60 and is configured to move past the recess 40 during a closing motion of the lid 60, and to block the hole in the wall 30 created by recess 40 when the lid 60 is in the closed position. Therefore, the cutting member 80 will provide a cutting action on any worm 50 or other bait that is laid in the recess 40 with a simple closing of the lid 60. After the lid 60 is closed, and the worm 50 is cut, the remaining portion of the worm 50 is enclosed neatly, and with minimal mess, inside the device 10. According to various example embodiments of the present general inventive concept, the cutting member 80 may be formed integral with the lid 60, or may be adhered to the lid 60 by any of a host of attachment methods. In some example embodiments the cutting member 80 may be provided with a cutting edge that is formed of a different material than the body of the cutting member 80. As illustrated in FIG. 1, the cutting member 80 may have a tapered edge to provide a sharp cut to the worm 50. In various example embodiments, as illustrated in FIG. 1, the edge of the cutting member 80 may be curved to provide a progressive cutting action to a worm placed in the recess 40 to improve the cutting. While the cutting member 80 illustrated in FIG. 1 is configured to be only slightly larger than the recess 40 itself, it is understood that different example embodiments may provide a host of different configurations. For example, the cutting member 80 may run substantially along an entire end length of the lid 60, or may be completely rounded to provide a constant curved cutting surface while moving past the recess 40, and so on. In this example embodiment, the cutting member 80 moves past the recess 40 in a shearing manner to rest adjacent an inner portion of the wall 30, but in other example embodiments the cutting member 80 may rest outside of the wall 30 in the closed position, or even be received in a slot formed in the wall 30 that is coplanar with the recess 40. In various example embodiments, the cutting member 80 may completely block the opening of the recess 40 when the lid 60 is in the closed position, while in other example embodiments the opening may be only partially blocked. With such a configuration, the remaining portion of the worm, as well as any associated detritus, is prevented from coming out of the enclosed device 10 to make a mess in the fisherman's pocket, hands, etc.

As illustrated in FIG. 1, the lid 60 may be configured to fit in register with the upper edge of the wall 30 of the base when in a closed position to form at least a near continuous enclosure. While the lid 60 in FIG. 1 is illustrated as having corresponding wall sections extending downward to fit substantially match the upper edge of the wall 30, it is understood that different configurations, such as a wholly flat lid (except for the cutting member 80) may be provided instead. As illustrated in FIG. 1, a latch member 90 may be provided to the lid 60 and configured to interact with a catch 100 to secure the lid in a closed position. In this example embodiment, the latch member 90 may be a flexible member, such as a flat spring, with a protuberance to fit over the catch 100, and a user can open the device 10 by simply pushing the latch member 90 outward from the catch 100. In various example embodiments, at least a portion of the wall 30 adjacent the catch may be configured to be flexible enough that a user can push on the flexible portion to release the latch member 90 from the catch 100, to aid in a one-handed opening operation. In various example embodiments the hinge member 70 may be configured to be biased in a direction to open the lid 60 when the latch member 90 and catch 100 are separated. In various example embodiments a groove may be formed in the wall 30 an area around the catch 100 to more easily guide such a pressing operation by a user, as well as to aid in the gripping of the device 10. One or more similar grooves may be provided along the opposite side of the wall to allow a user to use other fingers to brace the device during such a pushing operation. While the latch member 90 in FIG. 1 is provided to the lid 60, and the catch 100 is provided to the wall 30 of the base, it is understood that a reverse arrangement can be employed without departing from the scope of the present general inventive concept. Also, a host of different latching configurations may be employed to secure the lid in the closed position. For example, various example embodiments may employ a pivoting latch member to interact with a protuberance or indentation to lock the lid in a closed position. Different forms of hinge members may be used that are or are not biased in an open or closed direction of the lid 60. Also, various example embodiments may employ different method of securing the closed lid without a latch assembly. For example, either the walls 30 or lid 60 could be provided with a lip that interacts with the other of the walls 30 or lid 60 to provide a friction fit to keep the lid 60 closed until a user applies force to open the lid 60.

Figure 2:
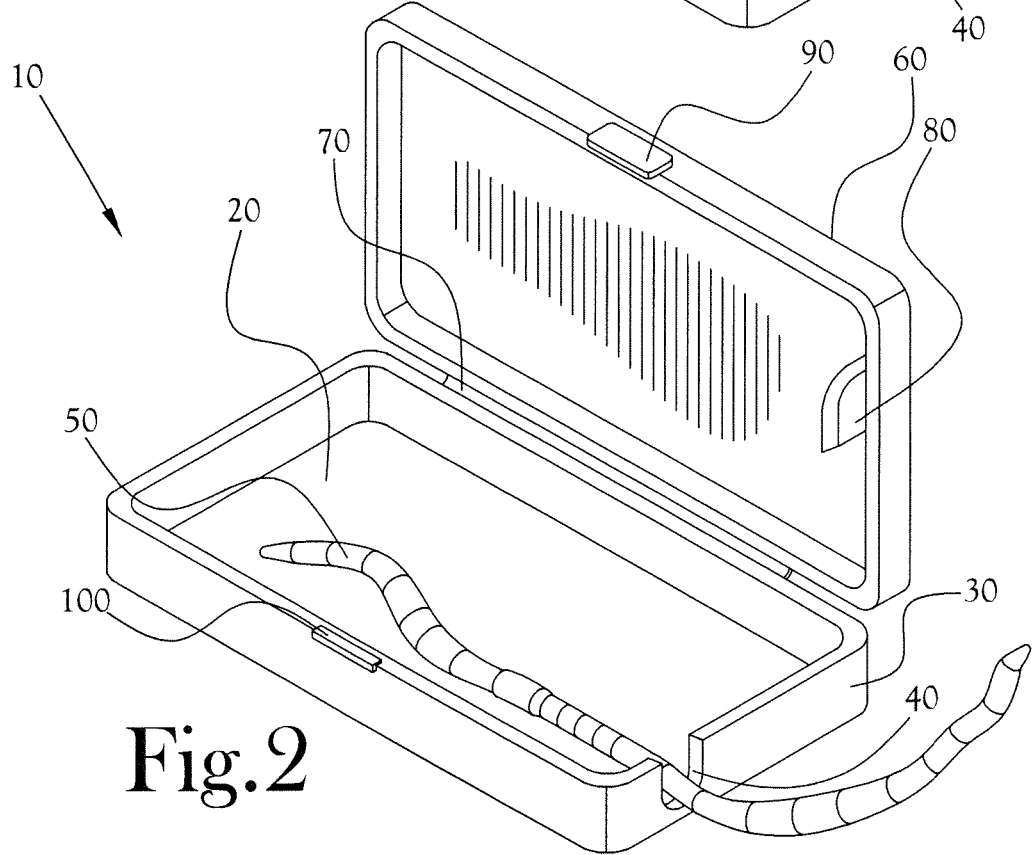
FIG. 2 illustrates the bait cutting and storage device of FIG. 1 with a worm that is positioned for cutting.
Figure 3:
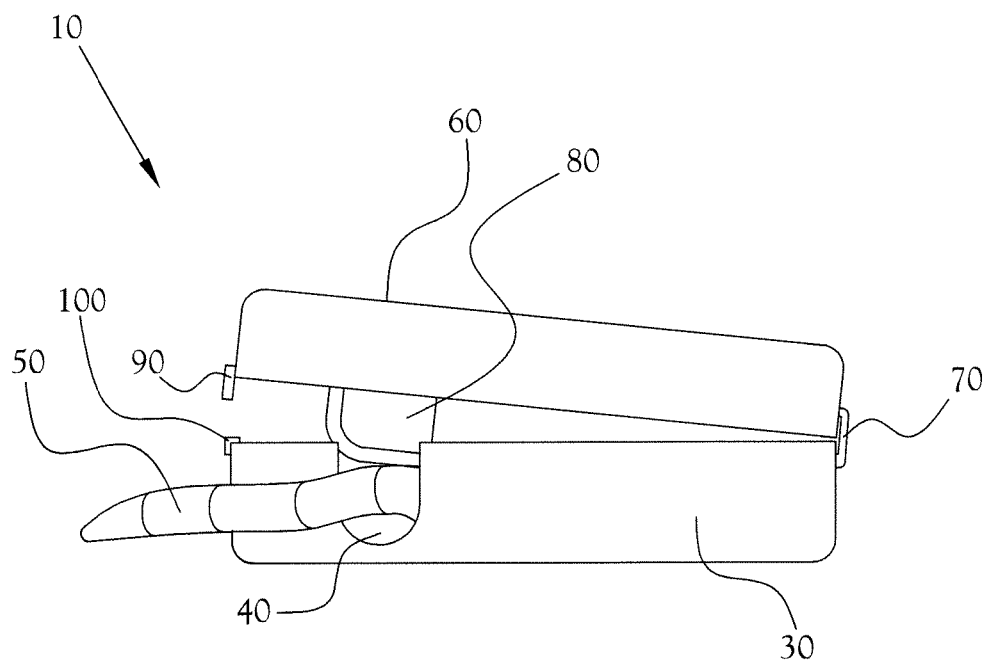
FIG. 3 illustrates the bait cutting and storage device of FIG. 1 during a closing/cutting operation.
Figure 4:
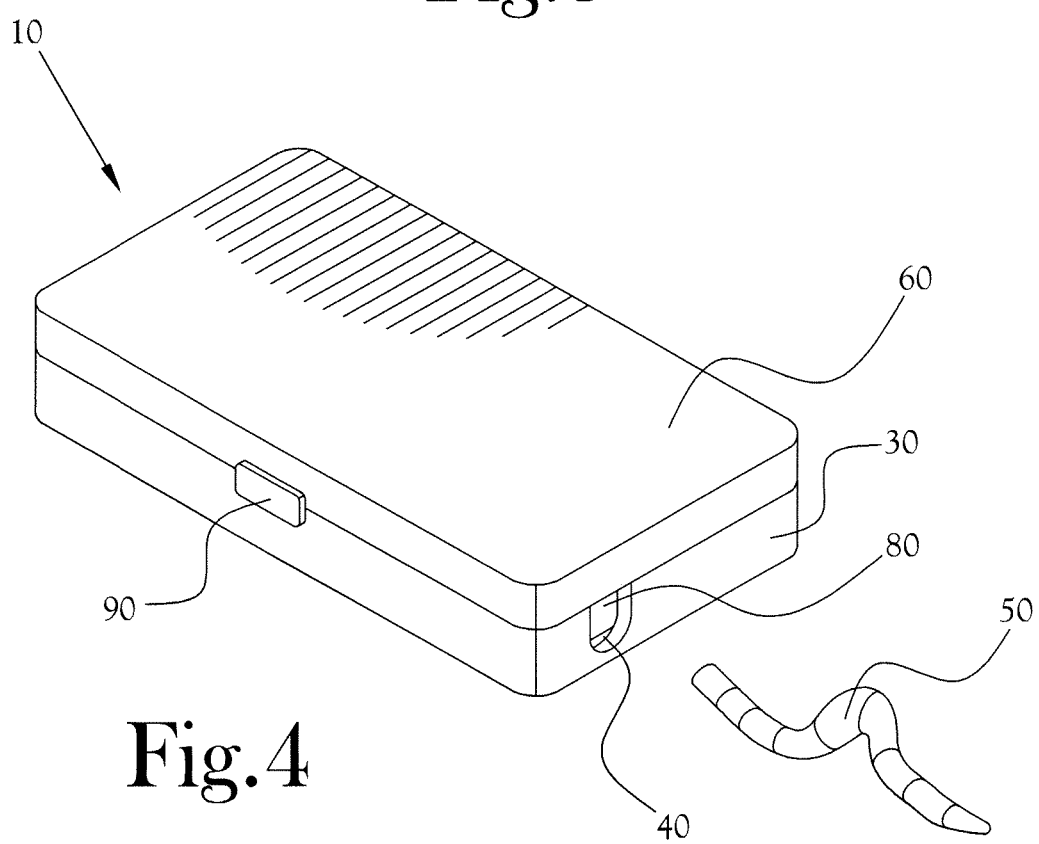
FIG. 4 illustrates the bait cutting and storage device of FIG. 1 in a closed position.

FIG. 2 illustrates the bait cutting and storage device of FIG. 1 with a worm that is positioned for cutting. As illustrated in FIG. 2, the worm 50 is placed so that the length of the worm 50 desired to be placed on the hook is outside the wall 30, and the length of the worm that will be stored in the device 10 extends inside the device 10 from the recess 40. A simple closing of the lid 60 will cut the worm at a point immediately inside the wall 30 at the recess 40. Such an operation can be performed easily with one hand, so that the fisherman can use the other hand to hold the detached portion of the worm, or the hook on which the to be detached portion is placed, etc. FIG. 3 illustrates the bait cutting and storage device of FIG. 1 during a closing/cutting operation. As illustrated in FIG. 3, the closing of the lid 60 moves the cutting member 80 through a plane that is substantially coplanar with the recess 40, at a position adjacent to the recess 40, to cut through the worm and to close the opening created by the recess 40. FIG. 4 illustrates the bait cutting and storage device of FIG. 1 in a closed position. As illustrated, when the lid 60 has been completely closed, completing the closing action illustrated in FIG. 3, the portion of the worm outside the wall 30 has been removed from the remainder of the worm inside the device 10, and the recess 40 is blocked on the inside by the cutting member 80, substantially enclosing the storage case now holding the remainder of the worm. The fisherman is then able to easily store and then access the remaining portion of the worm when rebaiting the hook at a later time. Various example embodiments of the device 10 may be formed of one or more of a host of materials, such as plastic, and is easily cleaned by simply rinsing the device with water after use.

Figure 5:
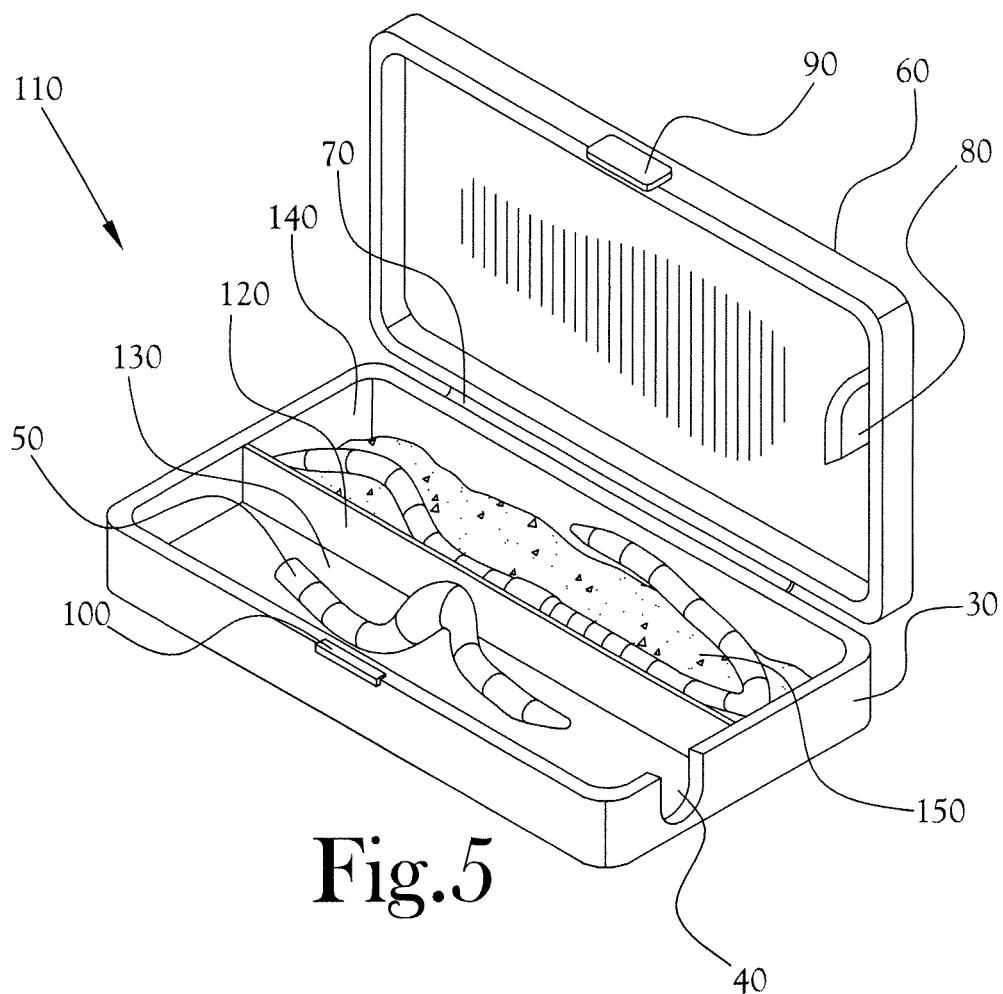
FIG. 5 illustrates a bait cutting and storage device according to another example embodiment of the present general inventive concept.

FIG. 5 illustrates a bait cutting and storage device according to another example embodiment of the present general inventive concept. In this example embodiment, a bait cutting and storage device 110 is provided with a partition 120 that bifurcates the enclosure into a first chamber 130 and a second chamber 140. With such a configuration, a fisherman can easily store one or more additional worms to be used after the initially cut worm has been depleted, while keeping those additional worms separated from the cut worm. As such, not only is the cut worm easy to discern from the uncut worms, but the mess associated with the cutting of the worms is kept separate from the second chamber 140. In various example embodiments, a moisture retaining member 150 or material, such as a sponge, may be provided along all or a portion of the floor in the second chamber to keep the additionally stored worms healthy for an extended period of time. In other words, by moistening the moisture retaining member 150, a moist environment favored by worms may be created/maintained in the second chamber 140.

Figure 6:
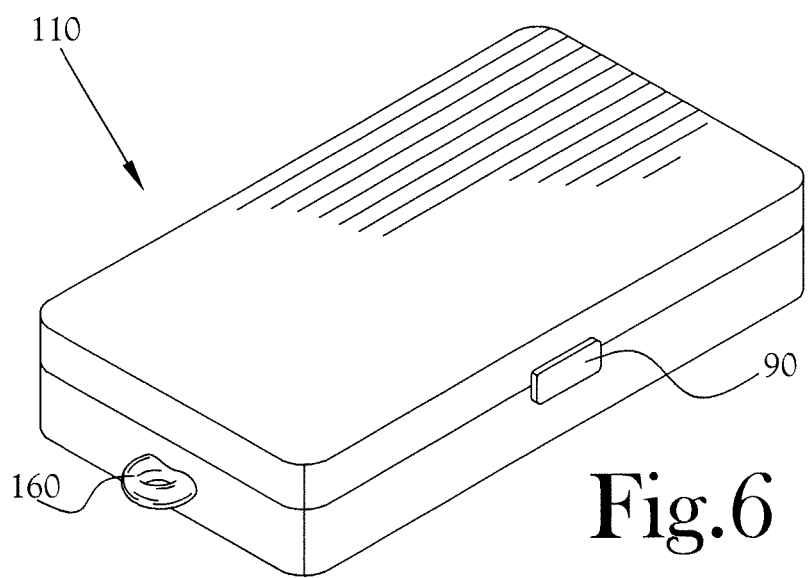
FIG. 6 illustrates another perspective view of the bait cutting and storage device illustrated in FIG. 5.

FIG. 6 illustrates another perspective view of the bait cutting and storage device illustrated in FIG. 5. As illustrated in FIG. 6, a loop member 160 is provided to the base of the device 110 so that the device 110 can be easily attached to a keyring for the convenience of the fisherman. It is understood that a host of different configurations can be provided to couple the device 110 to a keyring, and can be provided at a host of locations about the device. In various example embodiments, one or more through holes or other perforations may be provided to the device to aerate the inner portion or portions of the device.

Various example embodiments of the present general inventive concept may provide a device to cut and store bait, the device including a base including a floor and a wall extending upward from a perimeter of the floor, a recess extending from an upper edge of the wall, a lid configured to fit in register with the upper edge of the wall so as to form an enclosure with the base when the device is closed, and a cutting member extending from the lid and configured to be positioned adjacent the recess when the device is closed so as to substantially block access to the enclosure through the recess, wherein the cutting member is configured so as to move through an area adjacent and axial to the recess when the lid is being closed. The cutting member may have at least a partially tapered edge. The cutting member may be configured to be positioned at least partially adjacent an inner wall surface about the recess when the lid is closed. The cutting member may be configured with a curved cutting edge. The device may further include one or more hinge members configured to couple the lid to the base. The one or more hinge members are resilient members that are biased to move the lid to an open position. The device may further include a latch member provided to one of the base or the lid, and a catch provided to another one of the base or the lid, wherein the latch member and catch are configured to interact to secure the lid in a closed position. The latch member may be configured as a flat resilient member with a protuberance that slips over the catch when the lid is in the closed position. At least a portion of the wall adjacent the catch may be configured to be pliable such that the latch member is released from the catch by pressing inward on the portion of the wall adjacent the catch. The portion of the wall adjacent the catch may be formed with a groove configured to guide placement of inward pressure to release the latch member from the catch. A portion of the wall opposite the catch may be formed with one or more groves configured to receive fingers of a user so as to brace against pressure applied to the portion of the wall adjacent the catch during a latch release action. The recess may be configured so as to terminate with an arcuate edge. The base may be formed in a rectangular configuration, the wall including first and second opposing side walls, and first and second opposing end walls, wherein the lid may be coupled to the first side wall, and the recess may be formed in the first end wall. The device may further include a partition substantially bifurcating an area inside the wall of the base into first and second chambers, wherein the recess may be provided in a portion of the wall around the first chamber. The partition may extend upward to contact an underside of the lid when the lid is in a closed position. The device may further include a moisture retaining member provided over the floor in at least a portion of the second chamber. The device may further include a loop member integrated with the base or lid and configured to couple the device to a keyring. The base and/or lid may be configured with a lip around at least a portion of a perimeter thereof to provide a friction fit between the base and lid when the lid is in a closed position.

Various example embodiments of the present general inventive concept may provide a device to cut and store bait, the device including a rectangular base including a floor, first and second end walls extending upward from a perimeter of the floor, and first and second side walls extending upward from the perimeter of the floor, a lid configured to fit in register with an upper edge of the first and second end and side walls, a recess extending downward from an upper edge of the first end wall, and a cutting member extending from the lid and configured to be positioned adjacent the recess when the device is closed so as to substantially block access to the enclosure through the recess, wherein the cutting member is configured so as to move through an area adjacent and axial to the recess with a shearing action when the lid is being closed. The device may further include a partition wall extending between the first and second end walls to divide an area enclosed by the end and side walls into first and second chambers, wherein the recess is provided in the first chamber.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A method of cutting and storing bait, the method comprising:
   providing a selectively closable container having a rectangular base including a floor, first and second end walls extending upward from a perimeter of the floor first and second side walls extending upward from the perimeter of the floor, a lid configured to fit in register with an upper edge of the first and second end and side walls, a recess extending downward from an upper edge of the first end wall, a cutting member extending from the lid and configured to be positioned adjacent the recess when the device is closed so as to substantially block access to the enclosure through the recess, the cutting member being configured so as to move through an area adjacent and axial to the recess with a shearing action when the lid is being closed, and a partition wall extending between the first and second end walls to divide an area enclosed by the end and side walls into first and second chambers, wherein the recess is provided in the first chamber and a moist environment favored by worms is provided in the second chamber;
   placing a worm to be cut in the recess such that a portion to be cut away extends through the recess and out of the container;
   closing the lid to cut away the portion of the worm extending out of the container with the cutting member, and to block the recess with the cutting portion to contain a remainder of the cut worm inside the container.

2. The method of claim 1, wherein the cutting member is configured so as to move through an area adjacent and axial to the recess when the lid is being closed.

3. The method of claim 1, where the cutting member has at least a partially tapered edge.

4. The method of claim 1, wherein the partition wall extends upward to contact an underside of the lid when the lid is in a closed position.

5. The method of claim 1, wherein the second chamber has a moisture retaining member provided over the floor in the second chamber.

6. The method of claim 1, wherein the cutting member is formed integrally with the lid.

* * * * *